March 18, 1924.
B. F. COOK
1,487,542
SAW CLAMP OR VISE
Original Filed Oct. 25, 1919
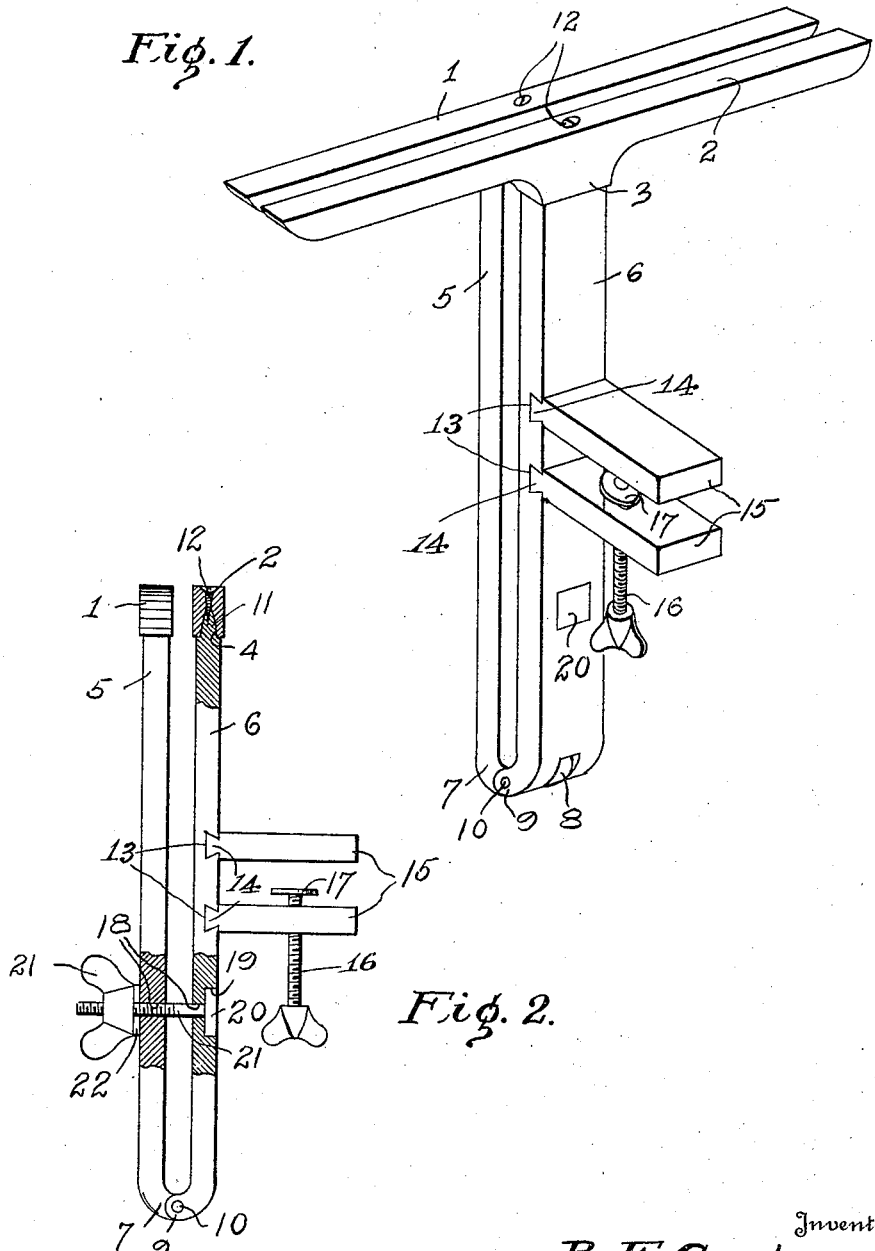
Fig. 1.
Fig. 2.
Witnesses
Inventor
B. F. Cook.
By 
Attorney Patented Mar. 18, 1924.

1,487,542

UNITED STATES PATENT OFFICE.

BENJAMIN F. COOK, OF PORTLAND, OREGON.

SAW CLAMP OR VISE.

Application filed October 25, 1919, Serial No. 333,137. Renewed August 11, 1923.

*To all whom it may concern:*

Be it known that I, BENJAMIN F. COOK, a citizen of the United States, residing at Portland, in the county of Multnomah and State of Oregon, have invented certain new and useful Improvements in Saw Clamps or Vises; and I do hereby declare the following to be a full, clear, and exact description of the invention, such as will enable others skilled in the art to which it appertains to make and use the same.

This invention relates to new and useful improvements in saw clamps or vises and the principal object of the invention is to provide a device adapted for holding saws during the filing and setting process.

Another object of the invention is to provide a device which is readily attachable to a bench, table or other supporting device which will allow the same to be readily removed and transported, without carrying therewith a supporting structure.

Still another object of the invention is to provide a clamp for supporting said device and holding the same against movement on the table or bench.

With these and other objects in view, the invention consists in the novel combination and arrangement of parts which will be fully set forth in the following specification and accompanying drawings, in which:—

Figure 1 is a perspective view of the saw clamp constructed in accordance with this invention, and Figure 2 is an end view partly in section showing the details of construction.

Referring to the drawing the numeral 1 designates one of the clamping heads, while the numeral 2 designates the cooperating clamp head. Each of these clamp heads is substantially T-shaped and the stem 3 thereof is formed with a tapered axial aperture 4 in which the tongue on the clamp arm is received.

One of the clamping arms is designated by the numeral 5 while the cooperating clamping arm is designated by the numeral 6 and each of these arms is formed at its lower end with an inwardly curved portion 7, and the curved portion on the clamping arm 5 is provided with a centrally disposed ear 8, while the curved portion of the arm 6 is provided with a pair of spaced inwardly extending ears 9, between which the ear 8 extends. These ears are provided with aligning apertures for the reception of the pivot pin 10 and it will thus be seen that the clamping arms and the heads will be pivotally connected. The upper end of each clamping arm is provided with an extension 11 which tapers upwardly and is adapted to fit within the tapered recess 4 in each head.

Suitable screws 12 extend through the upper faces of the heads and into the extensions 11 to hold the heads firmly in place thereon.

Formed in the arm 6 is a pair of spaced dove-tailed slots 13 for the reception of the dove-tailed tongues 14 formed at the ends of the outwardly extending parallel arms 15. These arms cooperate with each other in forming the bench clamps and the lowermost arm is provided with a threaded aperture through which the screw 16 extends. the upper end of this screw being provided with a suitable cap 17. Formed in each of the arms 5 and 6 are the aligning apertures 18 and the aperture in the arm 6 is provided with the countersink 19 in which the head 20 of the clamping bolt 21 seats. This clamping bolt is provided with a suitable thumb screw 21 which bears against the washer 22 which is interposed between said thumb screw and the outer side of the arm 5.

From the foregoing it will be apparent that in use, the device is placed on a bench by loosening the screw 16 and slipping the arm 15 over the edge of the table or bench, whereupon the operator tightens the screw 16 thus firmly clamping the device in place. The saw is then inserted between the heads 1 and 2 and the clamping arms 5 and 6 and upon tightening the thumb nuts 21, it will be apparent that the arms will be moved into clamping engagement and the heads will engage the saw adjacent the upper edge thus holding the same firmly in place and permitting the operator to sharpen the saw.

While in the foregoing there has been shown and described the preferred embodiment of this invention, it is to be understood that such changes may be made in the combination and arrangement of parts as will fall within the spirit and scope of the appended claims.

What is claimed is:—

1. A clamping device of the class described having arms with conical projections at the free ends thereof, arms to swivel thereon, and screws passing through the arms into the projections to bind the heads and projections to prevent independent relative movement.

2. A clamping device of the class described comprising arms, heads disposed at an angle thereto, a mounting clamp device disposed at an angle to the arms, said mounting clamps being carried by said arms and comprising blocks, one of which carries a fastening screw, and said head and clamp device being detachable from the arms so that they may be carried in a compact relation therewith.

3. A clamping device of the class described comprising arms, heads disposed at an angle thereto, a mounting clamp device disposed at an angle to the arms, said mounting clamp being carried by said arms and comprising two slidably detachable blocks one of which carries a fastening screw, and said head and said clamp device being detachable from the arms so that they may be carried in a compact relation therewith.

In testimony whereof I affix my signature in presence of two witnesses.

BENJAMIN F. COOK.

Witnesses:
   GERTRUDE DE YOUNG,
   GERTRUDE COOK.